(12) United States Patent
Nishiguchi et al.

(10) Patent No.: US 10,988,694 B2
(45) Date of Patent: Apr. 27, 2021

(54) FLAME RETARDANT RESIN COMPOSITION, AND FORMED PART AND WIRING MATERIAL EACH USING THE SAME

(71) Applicant: FURUKAWA ELECTRIC CO., LTD., Tokyo (JP)

(72) Inventors: Masaki Nishiguchi, Tokyo (JP); Arifumi Matsumura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/521,287

(22) Filed: Jul. 24, 2019

(65) Prior Publication Data

US 2019/0345391 A1 Nov. 14, 2019

Related U.S. Application Data

(63) Continuation of application No. PCT/JP2018/001671, filed on Jan. 19, 2018.

(30) Foreign Application Priority Data

Jan. 25, 2017 (JP) .............................. JP2017-011605

(51) Int. Cl.
| | | |
|---|---|---|
| *C09K 21/02* | (2006.01) | |
| *C08K 3/22* | (2006.01) | |
| *H01B 3/44* | (2006.01) | |
| *H01B 7/295* | (2006.01) | |

(52) U.S. Cl.
CPC ............. *C09K 21/02* (2013.01); *C08K 3/22* (2013.01); *H01B 3/44* (2013.01); *H01B 7/295* (2013.01); *C08K 2003/2227* (2013.01); *C08K 2201/005* (2013.01)

(58) Field of Classification Search
CPC .. C09K 21/02; C08K 3/22; C08K 2003/2227; C08K 2201/005; H01B 3/44; H01B 7/295

USPC ......................................................... 524/430
See application file for complete search history.

(56) References Cited

U.S. PATENT DOCUMENTS

| | | | |
|---|---|---|---|
| 2006/0216226 A1 | 9/2006 | Mitsunaka et al. | |
| 2006/0247355 A1 | 11/2006 | Kosaka et al. | |
| 2007/0217993 A1 | 9/2007 | Reimer et al. | |
| 2010/0324193 A1* | 12/2010 | Herbiet | C09K 21/02 524/437 |
| 2014/0087614 A1* | 3/2014 | Matsuda | C08K 3/26 442/59 |

FOREIGN PATENT DOCUMENTS

| | | |
|---|---|---|
| JP | 2004-51679 A | 2/2004 |
| JP | 2005-162912 A | 6/2005 |
| JP | 2006-328352 A | 12/2006 |
| JP | 2007-246389 A | 9/2007 |
| JP | 4614354 B2 | 1/2011 |
| JP | 2011-515307 A | 5/2011 |
| WO | WO 2012/077168 A1 | 6/2012 |
| WO | WO 2012/150661 A1 | 11/2012 |

OTHER PUBLICATIONS

International Search Report, issued in PCT/JP2018/001671, PCT/ISA/210, dated Apr. 10, 2018.
Written Opinion of the International Searching Authority, issued in PCT/JP2018/001671, PCT/ISA/237, dated Apr. 10, 2018.
Japanese Office Action dated Sep. 15, 2020 for corresponding Application No. 2017-011605 with an English translation.

* cited by examiner

*Primary Examiner* — William K Cheung
(74) *Attorney, Agent, or Firm* — Birch, Stewart, Kolasch & Birch, LLP

(57) ABSTRACT

A flame retardant resin composition containing from 30 to 300 parts by mass of a boehmite and an aluminum hydroxide as a total with respect to 100 parts by mass of the resin, wherein a content ratio of the boehmite and the aluminum hydroxide [content of boehmite:content of aluminum hydroxide] is from 85:15 to 15:85; a formed part; and a wiring material each using the same.

8 Claims, No Drawings

FLAME RETARDANT RESIN COMPOSITION, AND FORMED PART AND WIRING MATERIAL EACH USING THE SAME

CROSS-REFERENCE TO RELATED APPLICATIONS

This application is a Continuation of PCT International Application No. PCT/JP2018/001671 filed on Jan. 19, 2018, which claims priority under 35 U.S.C. § 119 (a) to Japanese Patent Application No. 2017-011605 filed in Japan on Jan. 25, 2017. Each of the above applications is hereby expressly incorporated by reference, in its entirety, into the present application.

TECHNICAL FIELD

The present invention relates to a flame retardant resin composition, and a formed part and a wiring material each using the same.

BACKGROUND ART

In the past, wiring materials used in an internal wiring or an external wiring of the electronic instrument (for example, an insulated wire, a cable, a (electric) cord, an optical fiber core wire, an optical fiber cord or cable, a vehicular (automobile or railway vehicle) wire or cable, a communication wire or cable, or a power wire or cable), or formed parts used for an automotive vehicle a railway vehicle, a marine vessel, an aircraft, an industrial hardware, an electronic instrument, or an electronic part have been required to have various kinds of properties such as flame retardancy and mechanical properties (for example, tensile property and elongation).

As a resin composition used for these formed parts, a polyolefin compound blended with a halogen-based flame retardant containing a halogen atom (bromine atom or chlorine atom) in the molecule has been used mainly. However, if the formed part using the above-described resin composition is burned, a corrosive gas such as a halogen gas from the halogen-based flame retardant is generated. In recent years, this problem has been discussed and a material containing a non-halogen flame retardant without risk of generation of a corrosive gas has been investigated. Examples of such resin composition include a resin composition containing a variety of resins, for example a polyolefin-based resin, a nylon-based resin, or a polyester-based resin, and a metal hydrate such as aluminum hydroxide or magnesium hydroxide as a non-halogen flame retardant. Further, examples of the non-halogen flame retardant used in the above-described resin composition also include a magnesium hydroxide subjected to a surface treatment with a phosphoric acid ester, or a heat-resistant aluminum hydroxide (Patent Literature 1) and the like.

CITATION LIST

Patent Literatures

Patent Literature 1: Japanese Patent No. 4614354

SUMMARY OF INVENTION

Technical Problem

Among the non-halogen flame retardants, magnesium hydroxide is widely used because it exhibits a relatively high retardancy improvement effect. However, the resin composition containing magnesium hydroxide is weak to acids (poor in acid resistance), so that its properties are lowered when exposed to, for example, acid rain or nitrogen oxides and the like contained in an exhausted gas. Therefore, although magnesium hydroxide subjected to a surface treatment with a phosphoric acid ester is also used as a flame retardant, this causes a decrease in mechanical strength, and also an acid resistance-improvement effect is not enough.

On the other hand, aluminum hydroxide has a low decomposition temperature (about 200° C.) and is easily foamed by decomposition at the time of preparation or forming (extrusion) of the resin composition. Therefore, a poor appearance or an internal failure (cavity) is caused in a formed body of the resin composition, so that a stable formed body cannot be obtained. This foaming cannot be suppressed enough even by using the heat-resistant aluminum hydroxide described in Patent Literature 1. As a result, it turned out that there is room for improvement.

Further, aluminum hydroxide forms almost no shell at the time of burning, so that dropping of burning matter is easily caused, and therefore there is room for improvement also in this point. In order to solve this problem, resin compositions containing a boehmite as a flame retardant have been proposed. However, there are not many examples thereof. This is because the boehmite has a small amount of heat absorption per unit mass at the time of decomposition, and also has a low dehydration amount, so that the resin composition containing the boehmite becomes easy to cause spread of flame and resultantly does not exhibit sufficient flame retardancy.

The present invention is contemplated to provide a flame retardant resin composition which is excellent in acid resistance and also allows suppression of foaming at the time of preparation or forming. Further, the present invention is contemplated to provide a formed part and a wiring material each using the forgoing flame retardant resin composition.

Solution to Problem

As a result of intensive studies, the present inventors found that a flame retardant resin composition in which aluminum hydroxide and a boehmite are adjusted to a specific total content and also the ratio of both contents is adjusted to a specific percentage could combine acid resistance and a high degree of flame retardancy and also could suppress foaming at the time of preparation or forming. Based on the forgoing findings, the present inventors repeated investigations and completed the present invention.

The above-described problems of the present invention are solved by the following means.

<1> A flame retardant resin composition containing from 30 to 300 parts by mass of a boehmite and an aluminum hydroxide as a total with respect to 100 parts by mass of a resin,
wherein a content ratio of the boehmite and the aluminum hydroxide [content of boehmite:content of aluminum hydroxide] is from 85:15 to 15:85.
<2> The flame retardant resin composition described in the item <1>, wherein the content ratio [content of boehmite: content of aluminum hydroxide] is from 85:15 to 30:70.
<3> The flame retardant resin composition described in the item <1> or <2>, wherein a particle size (D50) of the boehmite is from 0.5 to 2.5 µm.
<4> The flame retardant resin composition described in any one of the items <1> to <3>, wherein a particle size (D50) of the boehmite is from 0.7 to 2.2 µm.

<5> The flame retardant resin composition described in any one of the items <1> to <4>, wherein a particle size (D50) of the aluminum hydroxide is from 0.8 to 2.5 µm.
<6> The flame retardant resin composition described in any one of the items <1> to <5>, wherein the resin contains an ethylene-vinyl acetate copolymer, an ethylene-(meth)acrylic acid ester copolymer, an ethylene-(meth)acrylic acid copolymer, a polypropylene resin, a polyethylene resin, an ethylene-α-olefin copolymer, an ethylene-α-olefin-diene copolymer, a (hydrogenated) aromatic vinyl compound-conjugated diene compound block copolymer, a (hydrogenated) aromatic vinyl compound-conjugated diene compound random copolymer, a (hydrogenated) conjugated diene compound copolymer, a chlorinated polyethylene, a chloroprene rubber, an acrylic rubber, a polyurethane, a polyester elastomer or a polyamide elastomer, or a combination of these compounds.
<7> A formed part employing the flame retardant resin composition described in any one of the items <1> to <6>.
<8> A wiring material having a covering layer composed of the flame retardant resin composition described in any one of the items <1> to <6>.
<9> The wiring material described in the item <8>, wherein the covering layer is a crosslinked product of the flame retardant resin composition.
<10> The wiring material described in the item <8> or <9>, wherein the wiring material is an insulated wire or a cable.

In the present invention, the numeric range represented by the expression "to" means a range including the numerical values described before and after the expression "to" as a lower limit and an upper limit.

Further, the term "(meth)acrylic acid" is used in the sense of including acrylic acid and methacrylic acid.

Effects of Invention

The flame retardant resin composition of the present invention exhibits a high degree of flame retardancy free of both dropping of burning matter and spread of flame at the time of burning, and is also excellent in acid resistance, and further can suppress foaming at the time of preparation or forming. Further, in the formed part and the wiring material of the present invention, occurrence of appearance failure or internal failure is suppressed by using the flame retardant resin composition exhibiting the above-described excellent properties, so that they are also excellent in any of flame retardancy, acid resistance, and mechanical properties.

Other and further features and advantages of the invention will appear more fully from the following description.

MODE FOR CARRYING OUT THE INVENTION

[Flame Retardant Resin Composition]

The flame retardant resin composition of the present invention contains a resin, a boehmite and aluminum hydroxide.

The total (total content) of the boehmite and the aluminum hydroxide in the forgoing flame retardant resin composition is from 30 to 300 parts by mass with respect to 100 parts by mass of the resin. Further, within the range of the total content, the content ratio of the boehmite and the aluminum hydroxide [content of boehmite:content of aluminum hydroxide] is from 85:15 to 15:85, assuming that the total content of the boehmite and the aluminum hydroxide is 100.

The flame retardant resin composition of the present invention having the above-described constitution solves conventional problems described above, whereby it exhibits a high degree of flame retardancy free of both dropping of burning matter and spread of flame at the time of combustion, and is also excellent in acid resistance, and further allows suppression of foaming at the time of preparation or forming.

The details of the reason why the flame retardant resin composition of the present invention exhibits the above-described excellent properties are not clear yet. However, this can be considered as follows.

The boehmite has a high thermal conductivity and works to improve a resin viscosity, and therefore when mixed together with aluminum hydroxide and a resin, the boehmite forms a viscous mixture while getting heat out. Therefore, it is considered that a flame retardant resin composition can be prepared and formed while suppressing foam formation. Further, it is considered that at the time of combustion of the flame retardant resin composition, aluminum hydroxide and the boehmite are intermingled with each other to form one lump, whereby a shell is formed. Further, the aluminum hydroxide and the boehmite exhibit a suppression performance of the flame spread in cooperation with each other. Furthermore, by containing both the aluminum hydroxide and the boehmite, acid resistance can be given to the flame retardant resin composition without impairing the above-described high flame retardancy and the suppression performance of the foam formation.

It is considered that these acting functions are exhibited more effectively and well-balanced by using the aluminum hydroxide and the boehmite in combination so that, within the above-described total content range, the percentage of the above-described content ratio can be satisfied, and therefore the flame retardant resin composition of the present invention exhibits the above-described excellent properties.

The above-described foam formation of the flame retardant resin composition can be effectively suppressed by setting the particle size of the aluminum hydroxide or the boehmite to the range described below.

Further, the flame retardant resin composition of the present invention having the above-described constitution is also able to combine chemical resistance and heat resistance in addition to the above-described properties. The term "chemical resistance" means a property of suppressing the property degradation due to acid rain and nitrogen oxide or the like contained in an exhausted gas.

A total content of the boehmite and the aluminum hydroxide in the flame retardant resin composition of the present invention is in the above-described range. If the total content is too much, foam formation may sometimes occur at the time of forming, so that strength or elongation may be sometimes lowered. On the other hand, if the total content is too little, sufficient chemical resistance and flame retardancy sometimes may not be exhibited. In the present invention, from the viewpoints of combining flame retardancy, acid resistance, mechanical properties, and suppression property of the foam formation at higher level, the total content is preferably from 30 to 250 parts by mass, more preferably from 30 to 200 parts by mass, and particularly preferably from 30 to 160 parts by mass.

The content ratio (mass ratio) of the boehmite and the aluminum hydroxide [content of boehmite:content of aluminum hydroxide] in the flame retardant resin composition of the present invention is from 85:15 to 15:85, assuming that a total of the contents of the boehmite and the aluminum hydroxide is 100. If the content ratio of the aluminum hydroxide is too much, the above-described excellent properties may be sometimes impaired, and especially flame retardancy may be sometimes lowered due to suppression of the above-described shell formation. On the other hand, if the content ratio of the boehmite is too much, the above-described excellent properties may be sometimes impaired, and especially flame retardancy may be sometimes lowered due to easy spread of flame. From the viewpoints of combining the above-described excellent properties in a well-balanced manner and especially exhibiting a high flame retardancy, the above-described content ratio [content of boehmite:content of aluminum hydroxide] is preferably from 85:15 to 30:70, more preferably from 80:20 to 35:65, and particularly preferably from 60:40 to 40:60.

The content of each of the boehmite and the aluminum hydroxide in the flame retardant resin composition of the present invention is not particularly limited, as long as both the above-described total content and content ratio are satisfied. For example, the content of the boehmite in the flame retardant resin composition of the present invention is preferably from 10 to 250 parts by mass, more preferably from 20 to 150 parts by mass, and particularly preferably from 30 to 100 parts by mass. Further, the content of the aluminum hydroxide in the flame retardant resin composition of the present invention is preferably from 10 to 250 parts by mass, more preferably from 20 to 150 parts by mass, and particularly preferably from 30 to 80 parts by mass.

Components, production methods, intended uses and the like of the flame retardant resin composition according to the present invention are explained in detail below.

<Resin>

The resin is contained as a polymer component for the flame retardant resin composition of the present invention. Resins used in a resin composition which is able to form the above-described formed parts may be used without any particular limitation. Examples of the resin for use in the present invention include resins having an ethylene constituent which may have a substituent (for example, polyolefin resins). Examples of other resins include various kinds of rubbers or elastomers as a polymerization component of the flame retardant resin composition.

As the resin contained in the flame retardant resin composition, 1 kind or 2 or more kinds thereof may be used.

In the present invention, the resin is preferably an ethylene-vinyl acetate copolymer, an ethylene-(meth)acrylic acid ester copolymer, an ethylene-(meth)acrylic acid copolymer, a polypropylene resin, a polyethylene resin, an ethylene-α-olefin copolymer, an ethylene-α-olefin-diene copolymer, a (hydrogenated) aromatic vinyl compound-conjugated diene compound block copolymer, a (hydrogenated) aromatic vinyl compound-conjugated diene compound random copolymer, a (hydrogenated) conjugated diene compound copolymer, a chlorinated polyethylene, a chloroprene rubber, an acrylic rubber (these may be collectively referred to as polyolefin resins), a polyurethane, a polyester elastomer or a polyimide elastomer, or a combination of these compounds.

In the present invention, from the viewpoints of environmental and human safety, the resin is more preferably an ethylene-vinyl acetate copolymer, an ethylene-(meth)acrylic acid ester copolymer, an ethylene-(meth)acrylic acid copolymer, a polypropylene resin, a polyethylene resin, an ethylene-α-olefin copolymer, an ethylene-α-olefin-diene copolymer, a (hydrogenated) aromatic vinyl compound-conjugated diene compound block copolymer, a (hydrogenated) aromatic vinyl compound-conjugated diene compound random copolymer, a (hydrogenated) conjugated diene compound copolymer, an acrylic rubber, a polyurethane, a polyester elastomer or a polyamide elastomer, or a combination of these compounds.

From the viewpoints of the above-described effects of the present invention, the resin is more preferably an ethylene-vinyl acetate copolymer, an ethylene-(meth)acrylic acid ester copolymer, an ethylene-(meth)acrylic acid copolymer, a polypropylene resin, a polyethylene resin, an ethylene-α-olefin copolymer, an ethylene-α-olefin-diene copolymer (rubber), a polyurethane, a polyester elastomer or a polyamide elastomer, or a combination of these compounds.

From the viewpoints of the high flame retardancy, it is preferred that an ethylene-vinyl acetate copolymer, an ethylene-(meth)acrylic acid ester copolymer, or an ethylene-(meth)acrylic acid copolymer is at least contained as a resin.

As the resin or rubber composed of an ethylene-vinyl acetate copolymer, an ethylene-(meth)acrylic acid ester copolymer, and an ethylene-(meth)acrylic acid copolymer, ordinary materials may be used without any particular limitation.

Although a (meth)acrylic acid ester that forms the ethylene-(meth)acrylic acid ester copolymer is not particularly limited, examples thereof include esters of alcohols having 1 to 8 carbon atoms and (meth)acrylic acid. Specific examples thereof include methyl (meth)acrylate, ethyl (meth)acrylate, n-butyl (meth)acrylate, t-butyl (meth)acrylate, and 2-ethylhexyl (meth)acrylate.

The ethylene-vinyl acetate copolymer, the ethylene-(meth)acrylic acid copolymer, and the ethylene-(meth) acrylic acid ester copolymer are preferable as a resin for the flame retardant resin composition of the present invention from the viewpoint of exhibiting higher flame retardancy as described below.

That is, a COOR-type functional group (R represents a hydrogen atom or a substituent) contained in these copolymers causes a decarboxylation reaction at the time of thermal decomposition by combustion, thereby to generate $CO_2$ gas. In other words, a non-flammable gas is generated without venting a burning energy, whereby higher flame retardancy can be exhibited. Further, because the above-described COOR-type functional group is hydrophilic, interfacial strength between the above-described copolymer and the boehmite or the aluminum hydroxide is increased. Further, because a co-monomer that co-polymerizes with ethylene in the copolymers is bulky, acceptability of the boehmite and the aluminum hydroxide is increased. Accordingly, while suppressing the property degradation of the flame retardant resin composition of the present invention, higher flame retardancy can be given thereto by containing a large amount of the boehmite and the aluminum hydroxide.

With respect to each of the ethylene-vinyl acetate copolymers, the ethylene-(meth)acrylic acid copolymer, and the ethylene-(meth)acrylic acid ester copolymer, its melt flow rate (MFR) (JIS K 7210 (1999), temperature 190° C., load 2.16 Kg) is not limited in particular. From the viewpoints of mechanical properties and formability of the flame retardant resin composition, the forgoing MFR (temperature 190° C., load 2.16 Kg) is preferably 50 g/10 min or less, more preferably from 0.05 to 30 g/10 min, and still more preferably from 0.1 to 10 g/10 min.

Although the above-described polypropylene resin is not particularly limited, examples thereof include a homopolypropylene, a random polypropylene, a block polypropylene, and an atactic polypropylene.

Examples of the random polypropylene include a resin composed of a random copolymer of α-olefin (olefins having 2 to 4 carbon atoms are preferred) and propylene. Examples of the block polypropylene include a composition containing a homopolypropylene and an ethylene-α-olefin (for example, propylene) copolymer. In the present invention, the block polypropylene includes a reactor TPO. The reactor TPO is a composition containing a crystalline polypropylene resin and an ethylene-α-olefin copolymer rubber, and generally refers to those with a high content of the ethylene-α-olefin copolymer rubber. For the content ratio of the crystalline polypropylene resin and an ethylene-α-olefin copolymer rubber, from the viewpoints of thermal resistance and tackiness, from 20 to 70% by mass of the crystalline polypropylene resin and from 30 to 80% by mass of the ethylene-α-olefin copolymer rubber are preferred. Examples of the ethylene-α-olefin copolymer rubber contained in the reactor TPO include an ethylene-propylene copolymer rubber, an ethylene-butene copolymer rubber, an ethylene-hexene copolymer rubber, or an ethylene-octene copolymer rubber.

The tacticity of the polypropylene resin is not particularly limited and may be any of an isotactic polypropylene, a syndiotactic polypropylene, or an atactic polypropylene. Among these, the atactic polypropylene that is of low tacticity is preferred. An atactic polypropylene having a bending elastic modulus of 800 MPa or less is more preferred from the viewpoints of suppression of foam formation at the time of kneading, and capability of setting extrusion temperature low, and further easiness to keep water inside.

The MFR (JIS K 7210 (1999), temperature 230° C., load 2.16 Kg) of the polypropylene resin is not limited in particular. From the viewpoints of properties of the flame retardant resin composition (mechanical properties, impact property or thermal resistance) and formability, the forgoing MFR (temperature 230° C., load 2.16 Kg) is preferably 30 g/10 min or less, more preferably from 0.05 to 25 g/10 min, and still more preferably from 0.1 to 10 g/10 min.

The polyethylene resin, the ethylene-α-olefin copolymer, and the ethylene-α-olefin-diene copolymer are not limited in particular, as long as they are a resin or rubber composed of a polymer having an ethylene constituent. Examples thereof include very low density polyethylene (VLDPE), low density polyethylene (LDPE), or linear low density polyethylene (LLDPE). From the viewpoints of high strength, and capability of using large amounts of aluminum hydroxide and the like, linear low density polyethylene polymerized by a single-site catalyst (metallocene catalyst) is preferred.

For the α-olefin of the ethylene-α-olefin copolymer and the ethylene-α-olefin-diene copolymer, although this is not limited in particular, α-olefins having 2 to 8 carbon atoms are preferred.

Further, the diene of the ethylene-α-olefin-diene copolymer may be either a conjugated diene or a non-conjugated diene. However, a non-conjugated diene is preferred. Specific examples of the conjugated diene include conjugated diene compounds described below. Specific examples of the non-conjugated diene include dicyclopentadiene (DCPD), ethylidene norbornene (ENB), and 1,4-hexadiene, and ethylidene norbornene is preferred.

Examples of the ethylene-α-olefin copolymer and the ethylene-α-olefin-diene copolymer include an ethylene-propylene copolymer, an ethylene-1-butene copolymer, an ethylene-propylene-non-conjugated diene copolymer, an ethylene-1-hexene copolymer, or an ethylene-1-octene copolymer.

As for the polyethylene resin, the ethylene-α-olefin copolymer, and the ethylene-α-olefin-diene copolymer, those each having density of 0.865 to 0.935 g/cm$^3$ are preferred.

Further, as for the polyethylene resin, the ethylene-α-olefin copolymer, and the ethylene-α-olefin-diene copolymer, their MFR (JIS K 7210 (1999), temperature 190° C., load 2.16 Kg) are not limited in particular. From the viewpoints of mechanical properties and formability of the flame retardant resin composition, the forgoing MFR (temperature 190° C., load 2.16 Kg) is preferably 30 g/10 min or less, more preferably from 0.05 to 25 g/10 min, and still more preferably from 0.1 to 10 g/10 min.

A (hydrogenated) aromatic vinyl compound-conjugated diene compound block copolymer, a (hydrogenated) aromatic vinyl compound-conjugated diene compound random copolymer, and a (hydrogenated) conjugated diene compound copolymer are explained.

The (hydrogenated) aromatic vinyl compound-conjugated diene compound block copolymer is a block copolymer comprising at least one polymer block A mainly composed of constituents derived from an aromatic vinyl compound and at least one polymer block B mainly composed of constituents derived from a conjugated diene compound, or a hydrogenated product thereof, and may be either a resin or a rubber. Examples thereof include a block copolymer having a structure of A-B, A-B-A, B-A-B-A, A-B-A-B-A or the like, or a hydrogenated product thereof.

The polymer block A mainly composed of constituents derived from an aromatic vinyl compound is preferably consisting of only the constituents derived from the aromatic vinyl compound, or a copolymer block comprising at least 50% by mass, preferably at least 70% by mass of the constituents derived from the aromatic vinyl compound and an optional ingredient, for example, constituents derived from a conjugated diene compound.

Further, the polymer block B mainly composed of constituents derived from a conjugated diene compound is preferably consisting of only the constituents derived from the conjugated diene compound, or a copolymer block comprising more than 50% by mass, preferably at least 70% by mass of the constituents derived from the conjugated diene compound and an optional ingredient, for example, constituents derived from an aromatic vinyl compound.

As the above-described block copolymer, those containing 5 to 60% by mass, preferably 20 to 50% by mass of the constituents derived from an aromatic vinyl compound, assuming that all constituents of the block copolymer is 100% by mass, are preferred.

Further, with respect to each of the above-described polymer block A and the above-described polymer block B, a distribution of the constituents derived from the conjugated diene compound in a molecular chain, or a distribution of the constituents derived from the aromatic vinyl compound in a molecular chain may be random, tapered (it means that the content of the constituent increases or decreases along a molecular chain), partially blocky, or in a combination thereof. In a case where there are at least two above-described polymer blocks A or at least two above-described polymer blocks B, polymer blocks of the polymer block A or the polymer block B may be the same structure or may be different from each other.

Although the aromatic vinyl compound is not limited in particular, 1 or at least 2 compounds may be selected from, for example, styrene, t-butyl styrene, α-methyl styrene, p-methyl styrene, divinyl benzene, 1,1-diphenyl styrene, N,N-diethyl-p-aminoethyl styrene, vinyl toluene, and p-tertiary butyl styrene or the like.

Among them, styrene is especially preferred. Further, although the conjugated diene compound is not limited in particular, 1 or at least 2 compounds may be selected from, for example, butadiene, isoprene, 1,3-pentadiene, and 2,3-dimethyl-1,3-butadiene or the like. Among them, butadiene, isoprene, and a combination thereof are especially preferred.

Specific examples of the above-described (hydrogenated) aromatic vinyl compound-conjugated diene compound block copolymer include a styrene-butadiene-styrene copolymer (SBS), a styrene-isoprene-styrene copolymer (SIS), a styrene-ethylene-butadiene-styrene copolymer (SEBS), a styrene-ethylene-propylene-styrene copolymer (SEPS), a styrene-ethylene-ethylene-propylene-styrene copolymer (SEEPS), a partially hydrogenated styrene-butadiene-styrene copolymer (SBBS), and a styrene-ethylene-butylene-ethylene copolymer (SEBC).

The hydrogenated product of the above-described block copolymer is a hydrogenated block copolymer obtained by hydrogenation to a block copolymer comprising the above-described polymer block A and the above-described polymer block B. In this hydrogenated block copolymer, a mole ratio of an ethylene constituent formed by hydrogenation to a linear α-olefin constituent may be 2 or less. In this case, the content of the constituent derived from the aromatic vinyl compound is 50©% by mass or less and preferably from 5 to 35% by mass. If the content is more than 50% by mass, the hardness based on JIS hardness becomes higher than hardness 54D, so that foam formation becomes easy to occur at the time of forming, and therefore formability is likely to be impaired.

The above-described (hydrogenated) aromatic vinyl compound-conjugated diene compound random copolymer is a random copolymer comprising constituents derived from a conjugated diene compound and constituents derived from an aromatic vinyl compound, and may be either a resin or a rubber. As for this random copolymer, a number-average molecular weight thereof is preferably from 5,000 to 1,000,000, and more preferably from 10,000 to 350,000, and a value of polydispersity (weight-average molecular weight/number-average molecular weight) is 10 or less, and also a content of the vinyl bond such as 1,2-bond or 3,4-bond and the like of the constituents derived from a conjugated diene compound is 5% or more, and more preferably from 20 to 90% If the content is less than 5%, a hardness of the formed body obtained may be sometimes too high.

Herein, the content of the constituents derived from an aromatic vinyl compound is 40% by mass or less and preferably from 5 to 35% by mass.

The aromatic vinyl compound and the conjugated diene compound each have the same definition as those of the (hydrogenated) aromatic vinyl compound-conjugated diene compound block copolymer, and preferable compounds are also the same.

The constituents derived from an aromatic vinyl compound and the constituents derived from a conjugated diene compound are randomly bonded to each other, and by a Kolthoff method [I. M. Kolthoff. J. Polymer Sci., Vol. 1p. 429 (1946)], the content of the constituents derived from an aromatic vinyl compound in the block state is preferably 10% by mass or less, and more preferably 5% by mass or less of the constituents derived from all of the aromatic vinyl compounds bonding. Further, as for the above-described copolymers, those in which at least 90% of double bonds based on the constituents derived from the conjugated diene compound have been subjected to hydrogenation are preferred.

Specific examples of the above-described (hydrogenated) aromatic vinyl compound-conjugated diene compound random copolymer include a (hydrogenated) styrene-butadiene random copolymer and also hydrogenated SBR (DYNARON 1820P (trade name, manufactured by JSR Corporation).

The copolymers of the above-described (hydrogenated) conjugated diene compound are copolymers having constituents derived from the conjugated diene compound, and these copolymers may be any copolymers other than the above-described (hydrogenated) aromatic vinyl compound-conjugated diene compound block copolymer and the above-described (hydrogenated) aromatic vinyl compound-conjugated diene compound random copolymer. They may be either a resin or a rubber. The constituent to be copolymerized is not limited in particular, as long as it is other than the above-described aromatic vinyl compound. Examples thereof include a compound having a carbon-carbon double bond. Specific examples thereof include α-olefin and a hydride of the conjugated diene compound. Examples of this copolymer include a block copolymer (CEBC) having a crystalline ethylene block obtained by hydrogenation of a block copolymer of butadiene and a non-crystalline ethylene-butene block. In the present invention, the hydrogenated product of the copolymer composed of a conjugated diene compound may be used alone or in a combination of two or more kinds. Specific examples of the hydrogenated product of the copolymer composed of the conjugated diene compound include DYNARON 6100P (trade name, manufactured by JSR Corporation).

As for the above-described chlorinated polyethylene, a chlorinated polyethylene having a chlorine content of 20 to 45% by mass is preferred. By selecting the forgoing chlorinated polyethylene, it is possible to set the hardness to 20A or more and 54D or less based on JIS hardness, and in addition, it is possible to have a material having an excellent formability. The chlorination degree that achieves the above-described hardness is for example a chlorination degree of 20 to 45% by mass.

MFR (JIS K 7210 (1999), temperature 180° C., load 2.16 Kg) of the above-described chlorinated polyethylene are not limited in particular. From the viewpoints of properties (mechanical strength, low temperature properties, shock properties) and formability of the flame retardant resin composition, the forgoing MFR (temperature 180° C., load 2.16 Kg) is preferably 25 g/10 min or less, more preferably from 0.05 to 20 g/10 min, and still more preferably from 0.1 to 10 g/10 min.

Examples of the above-described chloroprene rubber include normal chloroprene rubbers and in addition, copolymers with a fluorine rubber.

The Mooney viscosity (ML1+4 (100° C.)) of the chloroprene rubber is preferably from 20 to 130, and more preferably from 40 to 110. Examples of commercial items of the chloroprene rubber include SKYPRENE (trade name, manufactured by Tosoh Corporation), DENKA CHLOROPRENE (trade name, manufactured by Denka Company Limited), and SHOPRENE (trade name, manufactured by Showa Denko K. K.).

It is preferable that crystallinity of the chloroprene rubber is low, but even high ones may be also used.

The above-described acrylic rubber is a rubber elastic body obtained by copolymerizing an alkyl acrylate such as methyl acrylate, ethyl acrylate, and butyl acrylate as a monomer component and a small amount of a monomer having various functional groups. Examples of the above-described monomer to be copolymerized include 2-chloroethylvinyl ether, methylvinyl ketone, acrylic acid, acrylonitrile, or butadiene. Specific examples of the acrylic rubber include NIPOL AR (trade name, manufactured by Zeon Corporation), and JSR AR (trade name, manufactured by JSR Corporation).

As for the alkyl acrylate, methyl acrylate is preferred. A binary copolymer of the acrylic rubber with ethylene, and a ternary polymer composed of the binary copolymer further copolymerized with an unsaturated hydrocarbon having a carboxyl group at the side chain thereof are preferred in particular. Examples of the above-described binary copolymer include VAMAC DP (trade name, manufactured by DuPont). Examples of the ternary polymer include VAMAC G, VAMAC HG, or VAMAC GLS, (each trade name, manufactured by DuPont).

If the flame retardant resin composition of the present invention contains an acrylic rubber, the oxygen index of the flame retardant resin composition increases, so that flame retardancy can be further improved.

In the present invention, Mooney viscosity and the like of the acrylic rubber is not limited in particular.

As for the polyurethane, polyester elastomer and the polyimide elastomer, normal materials may be used respectively without any particular limitation.

In the present invention, the above-described polymer components each include acid-modified ones, Examples of the acid-modified polymer components include a resin modified with an unsaturated carboxylic acid, more specifically a resin or rubber composed of maleic anhydride-modified ethylene-α-olefin copolymer, or acrylic acid-modified ethylene-α-olefin copolymer. Although the unsaturated carboxylic acid is not particularly limited, examples thereof include acrylic acid, methacrylic acid, maleic acid, itaconic acid, fumaric acid, maleic anhydride, itaconic anhydride, or fumaric anhydride. The modification amount with the carboxylic acid is preferably from 0.5 to 15% by mass with respect to the polymer component, <Aluminum Hydroxide>

Although aluminum hydroxide is not particularly limited, examples thereof include ordinary ones used in the flame retardant resin composition.

The particle size of the aluminum hydroxide, although it is not particularly limited, is preferably from 0.8 to 2.5 μm, and more preferably from 0.8 to 2.0 μm, in terms of frequency 50% diameter (referred to as particle diameter (D50)). If the particle diameter (D50) of the aluminum hydroxide is from 0.8 to 2.5 μm, decomposition of the aluminum hydroxide is further suppressed under the presence of boehmite, so that foam formation at the time of preparation (at the time of resin kneading), or at the time of forming can be more effectively suppressed. Further, dropping of the forming body at the time of combustion can be suppressed while maintaining shell-formation ability at the time of combustion, whereby flame retardancy can be further improved. Further, mechanical properties can be also maintained.

Measurement of the particle diameter (D50) of the aluminum hydroxide can be conducted according to the following method. In 100 mL-volumetric beaker, 50 ml of ethanol is taken, and about 0.2 g of aluminum hydroxide powder is added thereto, and the mixture obtained is subjected to an ultrasonic treatment for 3 minutes to prepare a dispersion liquid. With respect to this dispersion liquid, a particle size distribution on the volumetric basis is measured by a laser diffractometry-particle size analyzer MICROTRAC HRA Model 9320-X100 (trade name, manufactured by Nikkiso Co., Ltd.), to obtain the particle diameter (050) [μm] at the time of 50% by mass of cumulative distribution.

Examples of the aluminum hydroxide include BF013 (trade name, manufactured by Nippon Light Metal Company, Ltd.), HIGILITE H 42M, H 43M, (each trade name, manufactured by SHOWA DENKO K.K.), OL-104LEO, OL-107LEO (each trade name, manufactured by Huber Company), and C301N (trade name, manufactured by Sumitomo Chemical Co., Ltd.).

<Boehmite>

The boehmite means aluminum hydroxide monohydrate ($Al_2.H_2O$).

The particle size of the boehmite, although it is not particularly limited, is preferably from 0.5 to 2.5 μm, and more preferably from 0.7 to 2.2 μm in terms of the particle diameter (D50). If the particle diameter (D50) of the boehmite is from 0.5 to 2.5 μm, a kneading load can be effectively lowered in coexistence of aluminum hydroxide, so that foam formation at the time of preparation or at the time of forming can be effectively prevented. Further, a sufficient elongation can be given to a formed body of the flame retardant resin composition. Further, flame retardancy of the flame retardant resin composition can be improved, so that dropping of the flame retardant resin composition or its formed body can be effectively prevented.

The particle diameter (D50) of the boehmite can be measured in the same manner as the particle diameter (D50) of the aluminum hydroxide.

As for the boehmite, a surface-treated boehmite which has been subjected to a surface treatment may be used.

Examples of the surface treatment include a fatty acid treatment, a phosphoric acid treatment, a phosphate treatment, or a titanate treatment. Among them, form the viewpoint of insulating property, a fatty acid treatment, a phosphoric acid treatment, or a phosphate treatment are preferred, and a fatty acid treatment or a phosphate treatment are more preferred, and a phosphate treatment is still more preferred.

The fatty acid is not particularly limited, as long as it is ones ordinarily used for a surface treatment of the inorganic filler. Examples thereof include a saturated fatty acid having 10 to 22 carbon atoms and an unsaturated fatty acid having 10 to 22 carbon atoms. Specifically, examples of the saturated fatty acid include capric acid, lauric acid, myristic acid, palmitic acid, stearic acid, arachidic acid, and behenic acid. Examples of the unsaturated fatty acid include oleic acid, linolenic acid, and linoleic acid.

The phosphate is not particularly limited, as long as it is ones ordinarily used for a surface treatment of the inorganic filler. Examples thereof include stearyl alcohol phosphate or its metal salt, or lauryl alcohol phosphate or its metal salt.

The titanate is not particularly limited, as long as it is ones ordinarily used for a surface treatment of the inorganic filler.

Although the surface treatment amount for the boehmite is not particularly limited, for example, it is preferable that the amount is from 0.05 to 3.0% by mass with respect to 100% by mass of the boehmite.

The boehmite can be produced according to an ordinary method. For example, boehmite can be produced by subjecting aluminum hydroxide to a pressurized hydrothermal treatment using an autoclave. The conditions for the occasion are not particularly limited, and ordinary conditions may be adopted. By adequately setting a particle size of the aluminum hydroxide as a raw material or a hydrothermal treatment time and the like, it is possible to set the particle diameter (D50) of the boehmite, and further a shape or the like.

As for the boehmite, a commercial item may be used. Examples thereof include APYRAL AOH30 and APYRAL AOH60 (each trade name, manufactured by NabaltecGmbH) and BMM and BMB-1 (each trade name, manufactured by Kawai Lime Industry Co., Ltd.). {0052}

<Other Components>

The flame retardant resin composition of the present invention may contain various kinds of additives and the like generally used in the above-described formed parts, especially insulated wires or cables.

For example, in order to improve dispersibility of boehmite and aluminum hydroxide, at least one fatty acid metal salt of the metal selected from zinc, magnesium, and calcium. Examples of the fatty acid of the fatty acid metal salt include oleic acid, lauric acid, myristic acid, palmitic acid, and stearic acid, and stearic acid is preferred.

Further, examples of the additives other than the fatty acid metal salt include antioxidants, metal inactivators, flame retardant (flame retardant aid), filling agents, and lubricants.

The content of the additives may be set to the range that does not impair a purpose of the present invention.

Examples of the antioxidant include amine-based antioxidants such as 4,4'-dioctyl-diphenylamine, N,N'-diphenyl-p-phenylenediamine, 2,2,4-trimethyl-1,2-dihydroquinoline polymer; phenol-based antioxidants such as pentaerythritol-tetrakis(3-(3,5-di-tert-butyl-4-hydroxyphenyl)propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene; sulfur-based antioxidant such as bis(2-methyl-4-(3-n-alkylthiopropionyloxy)-5-tert-butylphenyl)sulfide, 2-mercaptobenzimidazole and zinc salts thereof, and pentaerythritol-tetrakis(3-lauryl-thiopropionate).

Examples of the metal inactivator may include N,N'-bis(3-(3,5-di-tert-butyl-4-hydroxyphenyl)propionyl)hydrazine, 3-(N-salicyloyl)amino-1,2,4-triazole, and 2,2'-oxamidebis(ethyl-3-(3,5-di-tert-butyl-4-hydroxyphenyl)propionate).

Specific examples of the flame retardant (flame retardant aid) or the filling agent include inorganic fillers other than other than both boehmite and aluminum hydroxide. Specific examples thereof include carbon, clay, zinc oxide, tin oxide; titanium oxide, magnesium oxide, molybdenum oxide, antimony trioxide, a silicone compound, quartz, talc, calcium carbonate, magnesium carbonate, and white carbon.

Examples of the lubricant include various kinds of lubricants such as hydrocarbon-series, fatty acid-series, fatty acid amide-series, ester-series, alcohol-series, and metal soap-series ones. Especially, examples thereof include ester-series, such as Wax E and Wax OP (trade names, manufactured by Hoechst AG), alcohol-series, and metal soap-series lubricants that show internal and external lubricity at the same time. Among them, zinc stearate, magnesium stearate, and calcium stearate each have the effect of improving insulation resistance, and zinc stearate and magnesium stearate each have the effect of preventing die build-up. Further, by using in combination with a fatty acid amide as a lubricant, it becomes possible to control adhesion to a conductor.

In a case where the flame retardant resin composition of the present invention is cross-linked, a cross-linking agent is preferably contained. As for the cross-linking agent, ones ordinarily used may be used depending on a cross-linking method without any particular limitation. Examples of the cross-linking agent include a phenol compound and a polyamine compound. In a case of electron beam cross-linking, use can be made of organic peroxides such as hydroperoxide, dialkyl peroxide, diacyl peroxide, peroxy ester, ketone peroxy ester, and ketone peroxide.

<Intended Use of Flame Retardant Resin Composition>

The flame retardant resin composition of the present invention can be preferably used for production of the formed parts (including a half-finished product, a product, or a member) requiring flame retardancy or acid resistance and the like.

Examples of the product requiring the above-described properties include wiring materials used for the internal wiring or the external wiring of the electronic instrument (for example, insulated wires, cables, (electric) cord, optical fiber core wire, optical fiber cord or cable, wires or cables for vehicles (automobiles or railway vehicle), wires or cables for communication, or wires or cables for power generation), automotive vehicles, railway vehicles, boats and ships, aircrafts, industrial hardware, electronic instrument or electronic parts.

Among them, the flame retardant resin composition is preferably used for formed parts requiring a higher level of flame retardancy and acid resistance, for example, wiring materials, or formed parts of automotive vehicles or railway vehicles and the like. The flame retardant resin composition of the present invention can be more preferably used for wiring materials. In particular, from the viewpoint of being able to take advantage of the above-described excellent properties, among wiring materials, the flame retardant resin composition can be preferably used for outdoor-use wiring materials or in-plant facility-use wiring materials.

[Formed Parts]

Next, the formed parts of the present invention are explained.

The formed parts of the present invention is for use in the above-described intended use, and its shape or structure and the like are not particularly limited and are adequately set depending on the intended use. Examples of such products include a tube material and a sheet member, in addition to the above-described wiring materials.

<Wiring Materials>

The wiring material of the present invention has a covering layer formed of the flame retardant resin composition of the present invention. Accordingly, the wiring material of the present invention exhibits the same excellent properties as the flame retardant resin composition of the present invention.

Although the wiring material is as described above, insulated wires or cables are preferred. In particular, outdoor-use, vehicular or in-plant facility-use insulated wires or cables that are exposed to acid rain or nitrogen oxide are preferred.

The insulated wire of the present invention has a conductor and a covering layer formed of the flame retardant resin composition of the present invention on a periphery (outer periphery surface) of the conductor. Other form of the insulated wire is not particularly limited, as long as it has the above-described constitution. The number of the conductor and the number of the covering layer may be either 1 or at least 2 respectively. Further, the cross-sectional shape is not particularly limited, and examples thereof include a circle, an oval figure, rectangle, or glasses type.

As the conductor, those ordinarily used for the insulated wire may be used without any particular limitation. Examples thereof include a metallic conductor of solid wire, twisted wire or the like made of a soft-drawn copper, copper alloy, aluminum, or the like. Further, as the conductor, in addition to a bare wire, a tinned wire or a wire having an enamel-covering layer and the like may be also used. In a case where the covering layer has a multi-layer structure, it is sufficient if at least one layer thereof is formed of the flame retardant resin composition of the present invention. In this case, other layers, for example, an interlayer, may be formed of a resin ordinarily used for an insulated wire, or a composition containing such resin.

The outside diameter of the insulated wire and the conductor is appropriately determined depending on its intended use or the like. The thickness of the covering layer, particularly the covering layer formed of the flame retardant resin composition of the present invention is appropriately determined depending on its intended use or the like. From the viewpoint of exerting excellent properties of the flame retardant resin composition of the present invention, the thickness is preferably from 0.15 to 1 mm.

The cable of the present invention has a plurality of insulated wires each having a conductor and a covering layer on the periphery of the conductor, and a covering layer (sheath) which collectively covers a bundled or twisted body formed by bundling or twisting the plurality of the insulated wires. In this cable, one of [the covering layer on the periphery of the conductor] and [the sheath], or both of them is (or are) formed of the flame retardant resin composition of the present invention.

The optical fiber or the optical fiber cable can be configured so that in the above-described insulated wire and cable, an optical fiber core wire is adopted in place of the conductor. That is, the optical fiber has the optical fiber core wire and a covering layer on the periphery (outer periphery) of the optical fiber core wire. Preferable embodiments and the like of the optical fiber or the optical fiber cable are the same as preferable embodiments of the above-described insulated wire or cable.

[Production of Flame Retardant Resin Composition and Formed Part]

The flame retardant resin composition of the present invention can be obtained by mixing, preferably melt-kneading each of the above-described components using an ordinarily used kneading apparatus such as a twin screw kneading extruder, a Banbury mixer, kneader, and roll. The kneading conditions such as a kneading temperature and a kneading time are not particularly limited. The kneading conditions can be appropriately set preferably in the temperature range that is equal to or more than the melting temperature of the resin. It is preferable to set the kneading temperature to a range of, for example, 120 to 220° C. In the time of mixing the above-described components, the flame retardant resin composition of the present invention to be mixed is hard to foam as described above.

In this way, the flame retardant resin composition in the uncrosslinked or non-crosslinked state can be prepared.

In the case where the flame retardant resin composition of the present invention is a crosslinked product, the above-described flame retardant resin composition or a formed body described below is crosslinked. In the present invention, from the viewpoint of formability, it is preferable that the above-described flame retardant resin composition is formed and then crosslinked. The crosslinking method is not particularly limited, and examples thereof include electron beam crosslinking method and chemical crosslinking method. As for the chemical crosslinking method, a crosslinking method other than a silane crosslinking method is preferable and examples thereof include phenol crosslinking method, amine crosslinking method, or peroxide crosslinking method. The crosslinking method is described below.

The formed parts or wiring materials of the present invention are produced using the flame retardant resin composition prepared as described above. For the production method, an appropriate forming method or processing method is adopted depending on a structure, a shape or a size and the like of the formed part and the like.

The wiring material of the present invention is produced, using the flame retardant resin composition, according to a method ordinarily adopted for the production of the electric wire. The wiring material is preferably produced by extrusion-forming a flame retardant resin composition on the periphery of a conductor, thereby to form a covering layer or a sheath.

The extrusion-forming of the flame retardant resin composition can be performed by extrusion-forming it on the periphery of a conductor or the like using a general-purpose extruder. The extrusion-forming conditions are appropriately set depending on the kind of the resin, the take-over speed of the conductor and the like. In the time of extrusion-forming, the flame retardant resin composition to be formed is hard to foam as described above.

In a case where the covering layer is formed by a crosslinked product of the flame retardant resin composition of the present invention, the flame retardant resin composition in the uncrosslinked or non-crosslinked state that has been extrusion-coated as described above is crosslinked. If the covering layer is formed by the crosslinked product, further improvement of thermal resistance and flame retardancy is possible.

For the crosslinking, appropriate methods or conditions can be adopted depending on the above-described crosslinking method.

In a case of crosslinking according to the electron beam crosslinking method, it is preferable to crosslink the flame retardant resin composition in the uncrosslinked or non-crosslinked state by irradiating thereto electron beams by a dose of 1 to 30 Mrad. In a case of crosslinking according to the chemical crosslinking method, it is preferable to crosslink the flame retardant resin composition in the uncrosslinked or non-crosslinked state by heat.

As described above, the flame retardant resin composition of the present invention is prepared, and the formed part or wiring material of the present invention using the same is produced.

In this way, the formed part and the like of the present invention have a covering layer and the like formed by the flame retardant resin composition of the present invention that exerts the above-described excellent properties. As described above, the flame retardant resin composition of the present invention combines high flame retardancy with excellent acid resistance, and foam formation can be suppressed at the time of preparation or forming. Accordingly, the formed part and the wiring material of the present invention also exert high flame retardancy and excellent acid resistance. Further, in the formed part and the wiring material of the present invention; occurrence of poor appearance or internal failure is suppressed, whereby quality of outer appearance and the like is high. In this way, the flame retardant resin composition of the present invention allows production of a formed part or a wiring material that has a high quality in terms of outer appearance or the like, and that is excellent in both acid resistance and flame retardancy.

EXAMPLES

Hereinafter, the present invention is explained in more detail on the basis of Examples. However, the present invention is not construed as being limited to these examples.

In Table 1, the numerical values of the formulation in each of Examples and Comparative Examples represent amounts in a part by mass, unless otherwise indicated. The blanks represent non-inclusion of the corresponding ingredient.

Examples 1, 2, 5 to 7, 9 to 12 and Comparative Example 4

Each of ingredients with blend amounts shown in Table 1 was poured in a Banbury mixer and was melt-mixed, and then discharged at discharge temperature of 180° C. This mixture was passed through a feeder ruder and then a round pelletizer to obtain a pellet of the flame retardant resin composition.

Next, the pellet obtained was introduced to an extruder equipped with a screw (compression member temperature of extruder: 170° C., head temperature: 180° C., die temperature: 200° C., screw rotation frequency: 20 rpm). The above-described pellet was extrusion-coated on the outer periphery of the conductor with 1/0.8TA mm, while melt-mixing the pellet in this extruder to obtain an insulated wire with an outer diameter of 2.4 mm.

Examples 3, 4, 8 and Comparative Examples 1 to 3

An insulated wire was obtained in the same manner as in Example 1, except for changing the above-described discharge temperature to 200° C.

Individual ingredients in Table 1 are as follows:
<Resin>
Ethylene-vinyl acetate copolymer: EVAFLEX V5274 R (trade name, vinyl acetate content: 17% by mass, MFR (190° C., 2.16 Kg) 0.8 g/10 min, manufactured by Dupont-Mitsui Polychemicals Co., Ltd.)

Ethylene-ethyl acrylate copolymer: NUC6510 (trade name, EA content: 23% by mass, MFR (190° C., 2.16 Kg) 0.5 g/10 min, manufactured by Unitika Ltd.)

Linear low density polyethylene: MERIT 0540F (trade name, LLDPE prepared using metallocene catalyst, MFR (190° C., 2.16 Kg) 4.0 g/10 min, density 0.92 g/cm$^3$, manufactured by Ube-Maruzen Polyethylene, Co., Ltd.)

Random polypropylene: PB222A (trade name, ethylene-propylene random copolymer, MFR (230° C., 2.16 Kg) 1.0 g/10 min, manufactured by SunAllomer Ltd.)

Ethylene-α-olefin-diene copolymer: NORDEL 3745P (trade name, Mooney viscosity 45 (ML1+4 (100° C.)), ethylene-propylene ethylidene norbornene rubber, density 0.880 g/cm$^3$, manufactured by Dow Chemical Company)

Acid-modified ethylene-α-olefin copolymer: FUSABOND E226Y (trade name, maleic anhydride-modified ethylene-α-olefin copolymer, MFR (190° C., 2.16 Kg) 1.75 g/10 min, density 0.93 g/cm$^3$, manufactured by DuPont Company)

The particle diameter (050) of the boehmite and the aluminum hydroxide is a value measured according to the above-described method.
<Boehmite>
Boehmite 1: particle diameter (D50) 1.05 μm, stearic acid treatment 0.6% by mass APYRAL AOH 30 (trade name, particle diameter (D50' 1.8 μm, manufactured by NabaltecGmbH)

APYRAL AOH 60 (trade name, particle diameter (050) 0.9 μm, manufactured by NabaltecGmbH)

BMT-33 (trade name, particle diameter (050) 3 μm, manufactured by Kawai Lime Industry Co., Ltd)

Boehmite 2: particle diameter (D50) 3 μm

Boehmite 3: particle diameter (D50) 0.4 μm, stearic acid treatment 0.6% by mass

Boehmite 4: particle diameter (050) 2 μm

Boehmite 1 was prepared by the following method using C-301N (trade name, manufactured by Sumitomo Chemical Co., Ltd.) as a raw material aluminum hydroxide.

4 Kg of aluminum hydroxide powder was weighed and poured in a 30 L volumetric polyethylene container, and 16 L of pure water was added thereto, and the mixture was agitated, whereby a slurry of aluminum hydroxide was prepared. The slurry obtained was casted in an autoclave having a HASTELLOY (registered trade mark) C-276-made wetted part, and was subjected to a hydrothermal treatment at 180° C. for about 12 hours under agitation, thereby to synthesize the boehmite. After the hydrothermal treatment, the slurry of the boehmite was cooled to room temperature and then was heated to 70° C. while agitating. After that, a sodium stearate aqueous solution prepared to 5% by mass was added thereto at 70° C., so as to be 0.6% by mass as stearic acid equivalent with respect to boehmite solid mass. The mixture obtained was agitated at 70° C. for 1 hour, whereby the aluminum hydroxide was subjected to a surface treatment according to such wet method, and then to a vacuum filtration. The solid content was washed with water (5 times or more in capacity with respect to boehmite solid mass), and then dried and pulverized, thereby to obtain a surface-treated boehmite powder.

Boehmite 2 was prepared in the same manner as in Boehmite 1, except for using C-303N (trade name, manufactured by Sumitomo Chemical Co., Ltd.) as a raw material aluminum hydroxide without a surface treatment.

Boehmite 3 was prepared in the same manner as in Boehmite 1, except for using particles formed by pulverizing C-301N (trade name, manufactured by Sumitomo Chemical Co., Ltd.) as a raw material aluminum hydroxide, to a particle size (D50) of 0.5 μm.

Boehmite 4 was prepared in the same manner as in Boehmite 1, except for using OL-104LEO (trade name, manufactured by Huber Corporation) as a raw material aluminum hydroxide and not conducting the surface treatment.
<Aluminum Hydroxide>
HIGILITE H42M (trade name, particle size (D50) 1.0 μm, manufactured by Showa Denko k. k.)
<Filler>
Calcium carbonate: SOFTON 1200 (trade name, manufactured by Shiraishi Calcium Kaisha, Ltd.)
<Antioxidant>
Trade name: IRGANOX 1010, compound name: pentaerythritol tetrakis [3-(3,5-di-t-butyl-4-hydroxyphenyl)propionate], manufactured by BASF SE
<Lubricant>
Calcium stearate (manufactured by NOF Corporation)
<Evaluation of Insulated Wire and the Like>
With respect to the insulated wire or the flame retardant resin composition produced, the following properties were evaluated. The results obtained are shown in Table 1.
<Foaming test 1>

The surface (appearance) and the interior (cutting plane of the covering layer when cut by a plane perpendicular to axis of the wire) of the covering layer of the insulated wire obtained by the above-described method were observed and evaluated in accordance with the following criteria.

A: Those in which foam formation could not be confirmed in both the surface and the interior of the covering layer B: Those in which foam formation could not be confirmed in the surface of the covering layer, but could be confirmed in the interior thereof D: Those in which foam formation could be confirmed in the surface of the covering layer In this test, the evaluations "A" and "B" are a pass level.

<Foaming Test 2>

Insulated wires for foaming test 2 were each produced in the same manner as in the above-described insulated wires, except for changing the screw rotation number to 50 rpm in the production of the above-described insulated wires. With respect to the insulated wire produced, the surface and the interior of the covering layer were evaluated in the same manner as in the foaming test 1.

This test is a reference test, and it is not necessary to pass the test.

<Tensile Test>

A tensile test of the conduit piece was conducted under the conditions of gauge length: 50 mm and tension speed: 200 mm/min in conformity with JIS C 3005. The conduit piece was prepared by picking a conductor out of each of the above-described insulated wires.

In this test, 9 MPa or more in the tensile strength is a pass level and 10 MPa or more is preferable. Further, 200% or more in the elongation (at the time of breaking) is a pass level and 350% or more is preferable.

<60° Angle Flame-Retardant Test>

With respect to each of the above-described insulated wires, 3 specimens were prepared. The 60° Angle flame-retardant test was conducted by fixing the ignition time to 4 seconds using each specimen in conformity with JIS C 3005. Those in which fire was extinguished naturally within 60 seconds in the self-extinguishing time after taking a flame away from the each specimen were decided to pass the test.

In evaluation of the 60° Angle flame-retardant test, with respect to the each of the above-described insulated wires, the case where even one of 3 specimens passed the test was ranked as "A", whereas the case where all of 3 specimens did not passed the test was ranked as "D".

<Sheet Flame Retardant Test>

Using each pellet obtained by production of the above-described insulated wires, a sheet-like specimen of B5 paper size (182 mm×257 mm) with a thickness of 1.2 mm was prepared. The each sheet-like specimen obtained was maintained at 45° inclination. A fuel canister was arranged so that a bottom center of the canister was at the position of 25.4 mm (1 inch) vertically below the underside (burning side) center of the sheet-like specimen. This fuel canister was placed on a platform made of a material (cork) with a low thermal conductivity. In the fuel canister, 0.5 ml of pure ethyl alcohol was poured and ignited, and left to strand until the fuel got burned out. This test was conducted in conformity with Guidance of flame test for railway vehicle (2016 fiscal year new system) published by Japan Railway Rolling Stock & Machinery Association.

After that, retardancy of the sheet-like specimen was evaluated in accordance with the following criteria.

A: The sheet-like specimen in which a hole was not gotten during combustion and neither ignition nor afterflame remained.

B: The sheet-like specimen in which a hole was not gotten during combustion and afterflame remained, but the sheet-like specimen was not burned down C: The sheet-like specimen in which a hole was not gotten during combustion and afterflame remained, and the sheet-like specimen was burned down D: The sheet-like specimen in which a hole was gotten during combustion, and the sheet-like specimen was burned down In this test, evaluations "A" to "C" are a pass level.

TABLE 1

| | | particle diameter | Ex. 1 | Ex. 2 | Ex. 3 | Ex. 4 | CEx. 1 | CEx. 2 | CEx. 3 | Ex. 5 |
|---|---|---|---|---|---|---|---|---|---|---|
| Resin | Ethylene-vinyl acetate copolymer | | 90 | | | 70 | | | | |
| | Ethylene-ethyl acrylate copolymer | | | 90 | | | | | | 90 |
| | Linear low density polyethylene | | | | 50 | | 50 | 50 | 70 | |
| | Random polypropylene | | | | 20 | 20 | 20 | 20 | 20 | |
| | Ethylene-α-olefin-diene copolymer | | | | | 20 | | 20 | 20 | |
| | Acid-modified ethylene-α-olefin copolymer | | 10 | 10 | 10 | 10 | 10 | 10 | 10 | 10 |
| Boehmite | Boehmite 1 | 1.05 | 80 | 50 | 30 | 20 | 100 | 10 | | |
| | APYRAL AOH30 | 1.8 | | | | | | | | 40 |
| | APYRAL AOH60 | 0.9 | | | | | | | | |
| | BMT-33 | 3 | | | | | | | | |
| | Boehmite 2 | 3 | | | | | | | | |
| | Boehmite 3 | 0.4 | | | | | | | 10 | |
| | Boehmite 4 | 2 | | | | | | | | |
| Aluminum hydroxide | HIGILITE H42M | 1 | 20 | 50 | 70 | 80 | | 90 | 90 | 60 |
| Total amount of boehmite and aluminum hydroxide | | | 100 | 100 | 100 | 100 | 100 | 100 | 100 | 100 |
| Content ratio [Boehmite:Aluminum hydroxide] | | | 80:20 | 50:50 | 30:70 | 20:80 | 100:0 | 10:90 | 10:90 | 40:60 |
| Filler | Calcium carbonate | | | | | | | | | |
| Antioxidant | IRGANOX 1010 | | 0.25 | 0.25 | 0.25 | 0.25 | 0.25 | 0.25 | 0.25 | 0.25 |
| Lubricant | Calcium stearate | | 1 | 1 | 1 | 1 | 1 | 1 | 1 | 1 |
| Foaming test 1 | | | A | A | A | A | A | D | D | A |
| Foaming test 2 | | | A | A | A | D | A | D | D | A |
| Tensile strength (MPa) | | | 14.5 | 11.8 | 13.2 | 15.2 | 16.2 | 7.6 | 8.9 | 10.8 |
| Elongation (%) | | | 455 | 430 | 420 | 425 | 335 | 360 | 400 | 393 |
| 60° Angle flame-retardant test (ignition time to 4 seconds) | | | A | A | A | A | D | A | A | A |
| Sheet flame retardant test | | | A | A | B | B | A | D | D | B |

| | | particle diameter | Ex. 6 | Ex. 7 | Ex. 8 | Ex. 9 | Ex. 10 | CEx. 4 | Ex. 11 | Ex. 12 |
|---|---|---|---|---|---|---|---|---|---|---|
| Resin | Ethylene-vinyl acetate copolymer | | | | | | | | | |
| | Ethylene-ethyl acrylate copolymer | | 90 | | | | 90 | | | |
| | Linear low density polyethylene | | | 50 | 50 | 50 | | 50 | 50 | 50 |
| | Random polypropylene | | | 20 | 20 | 20 | | 20 | 20 | 20 |

TABLE 1-continued

|  |  | particle size | | | | | | | | |
|---|---|---|---|---|---|---|---|---|---|---|
|  | Ethylene-α-olefin-diene copolymer |  |  | 20 | 20 | 20 |  | 20 | 20 | 20 |
|  | Acid-modified ethylene-α-olefin copolymer |  | 10 | 10 | 10 | 10 | 10 | 10 | 10 | 10 |
| Boehmite | Boehmite 1 | 1.05 |  |  |  |  |  |  | 35 |  |
|  | APYRAL AOH30 | 1.8 |  |  |  |  | 30 |  |  |  |
|  | APYRAL AOH60 | 0.9 | 40 |  |  |  |  |  |  |  |
|  | BMT-33 | 3 |  | 30 |  |  |  |  |  |  |
|  | Boehmite 2 | 3 |  |  | 30 |  |  |  |  |  |
|  | Boehmite 3 | 0.4 |  |  |  | 30 |  |  |  |  |
|  | Boehmite 4 | 2 |  |  |  |  |  |  |  | 50 |
| Aluminum hydroxide | HIGILITE H42M | 1 | 60 | 70 | 70 | 70 | 70 | 50 | 35 | 50 |
| Total amount of boehmite and aluminum hydroxide |  |  | 100 | 100 | 100 | 100 | 100 | 50 | 70 | 100 |
| Content ratio [Boehmite:Aluminum hydroxide] |  |  | 40:60 | 30:70 | 30:70 | 30:70 | 30:70 | 0:100 | 50:50 | 50:50 |
| Filler | Calcium carbonate |  |  |  |  |  |  | 50 | 30 |  |
| Antioxidant | IRGANOX 1010 |  | 0.25 | 0.25 | 0.25 | 0.25 | 0.25 | 0.25 | 0.25 | 0.25 |
| Lubricant | Calcium stearate |  | 1 | 1 | 1 | 1 | 1 | 1 | 1 | 1 |
| Foaming test 1 |  |  | A | B | B | B | A | A | A | A |
| Foaming test 2 |  |  | A | D | D | D | B | A | A | A |
| Tensile strength (MPa) |  |  | 12.5 | 9.5 | 9.8 | 17.7 | 11.8 | 10.9 | 12.4 | 11.9 |
| Elongation (%) |  |  | 440 | 450 | 340 | 210 | 460 | 480 | 440 | 420 |
| 60° Angle flame-retardant test (ignition time to 4 seconds) |  |  | A | A | A | A | A | A | A | A |
| Sheet flame retardant test |  |  | A | C | C | B | A | D | B | B |

Remarks: 'Ex.' means Example and 'CEx.' means Comparative Example.

From the results in Table 1, the following facts are understood.

Comparative Example 1 containing no aluminum hydroxide did not pass the 60' Angle flame-retardant test. Comparative Examples 2 and 3 each having too little content of Boehmite did not pass the Foaming tests 1 and 2, and were poor in sheet flame retardancy. Further, Comparative Example 4 containing no Boehmite was poor in sheet flame retardancy.

In contrast, it can be understood that Examples 1 to 12 in which Boehmite and aluminum hydroxide were used in combination so as to satisfy the above-described content ratio within the above-described total content range, each pass the foaming test 1 and the flame retardancy test, and further excellent acid resistance is exerted by containing both Boehmite and aluminum hydroxide. That is, it is seen that the flame retardant resin composition exerts high flame retardancy and also has excellent acid resistance, and further is able to suppress foam formation at the time of preparation or forming. Further, it was seen that the formed part and the wiring material of the present invention using the flame retardant resin composition of the present invention suppressed occurrence of appearance failure or internal failure, and further was excellent in both flame retardancy and acid resistance.

In particular, it was seen that when using the Boehmite having a particle size (D50) of 0.5 to 2.5 µm, the foam formation at the time of preparation or forming was highly suppressed without impairing flame retardancy and acid resistance.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2017-011605 filed in Japan on Jan. 25, 2017, which is entirely herein incorporated by reference.

The invention claimed is:

1. A flame retardant resin composition comprising from 30 to 300 parts by mass of a boehmite and an aluminum hydroxide as a total with respect to 100 parts by mass of a resin,
wherein a content ratio of the boehmite and the aluminum hydroxide [content of boehmite:content of aluminum hydroxide] is from 80:20 to 50:50, and
wherein a particle size (D50) of the boehmite is from 0.5 to 2.5 µm.

2. The flame retardant resin composition according to claim 1, wherein a particle size (D50) of the boehmite is from 0.7 to 2.2 µm.

3. The flame retardant resin composition according to claim 1, wherein a particle size (D50) of the aluminum hydroxide is from 0.8 to 2.5 µm.

4. The flame retardant resin composition according to claim 1,
wherein the resin comprises an ethylene-vinyl acetate copolymer, an ethylene-(meth)acrylic acid ester copolymer, an ethylene-(meth)acrylic acid copolymer, a polypropylene resin, a polyethylene resin, an ethylene-α-olefin copolymer, an ethylene-α-olefin-diene copolymer, a (hydrogenated) aromatic vinyl compound-conjugated diene compound block copolymer, a (hydrogenated) aromatic vinyl compound-conjugated diene compound random copolymer, a (hydrogenated) conjugated diene compound copolymer, a chlorinated polyethylene, a chloroprene rubber, an acrylic rubber, a polyurethane, a polyester elastomer or a polyimide elastomer, or a combination of these compounds.

5. A formed part employing the flame retardant resin composition according to claim 1.

6. A wiring material having a covering layer composed of the flame retardant resin composition according to claim 1.

7. The wiring material according to claim 6, wherein the covering layer is a crosslinked product of the flame retardant resin composition.

8. The wiring material according to claim 6, wherein the wiring material is an insulated wire or a cable.

* * * * *